UNITED STATES PATENT OFFICE.

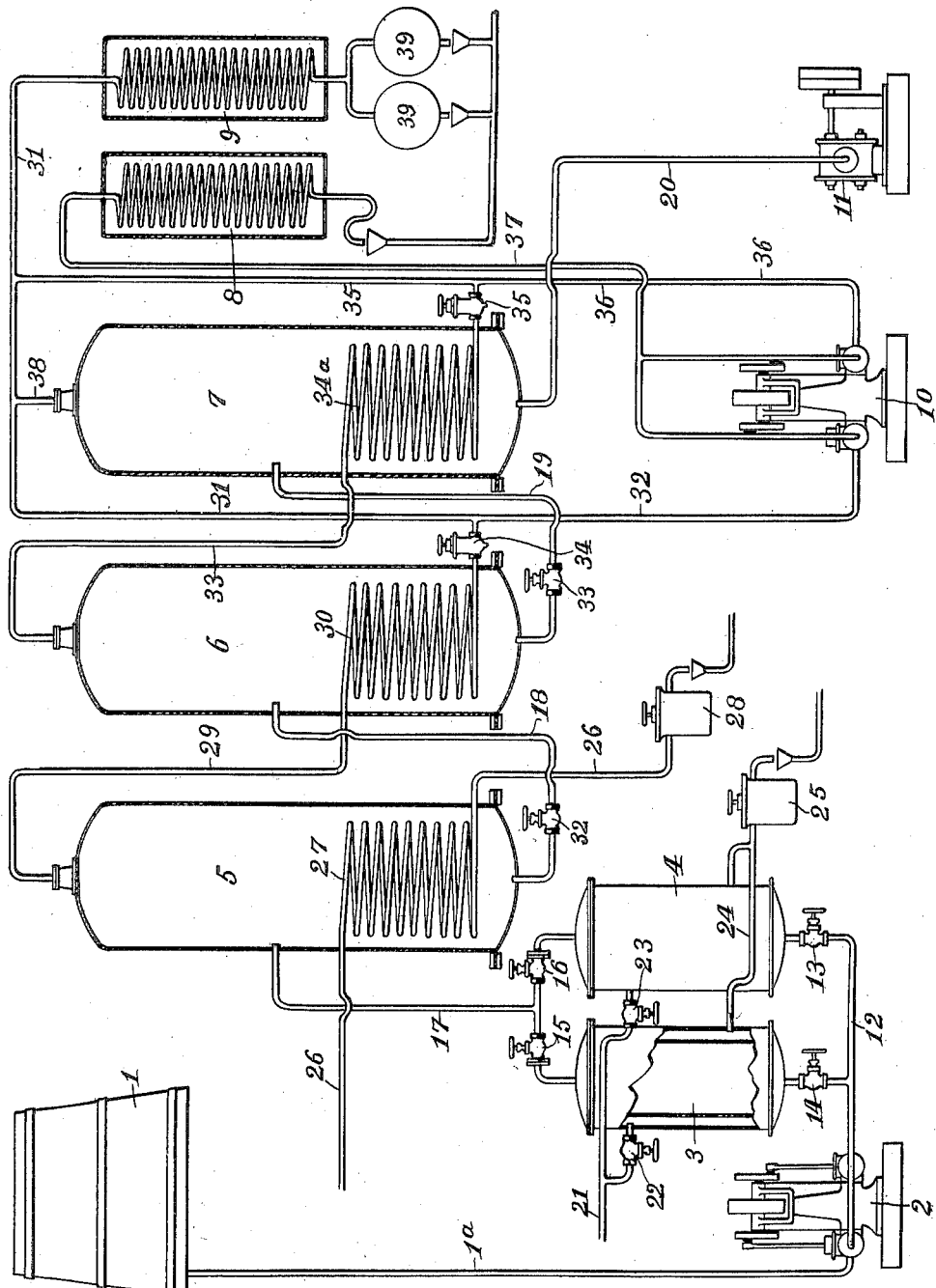

MAX KLAR, OF MARQUETTE, MICHIGAN.

PROCESS FOR DISTILLING CRUDE PYROLIGNEOUS ACID.

1,089,417. Specification of Letters Patent. Patented Mar. 10, 1914.

Application filed April 17, 1911. Serial No. 621,605.

*To all whom it may concern:*

Be it known that I, MAX KLAR, a citizen of the Empire of Germany, and a subject of the Emperor William, now residing at Marquette, in the county of Marquette and State of Michigan, have invented certain new and useful Improvements in Processes for Distilling Crude Pyroligneous Acid; and I do hereby declare the following to be a full, clear, and exact description of the invention, such as will enable others skilled in the art to which it appertains to make and use the same.

My invention relates to improvements in processes for distilling crude pyroligneous acid and its object is to provide for economy of heating, to provide means whereby the stills may be run continuously, to prevent clogging of the stills and to provide various improved features of the process as hereinafter more fully described and particularly pointed out in the claims and which will be more fully understood by reference to the accompanying drawing which is a diagrammatic representation of an apparatus adapted to perform my improved process.

In the destructive distillation of wood, the condensate separates into a layer of tar and a watery layer. This watery layer, separated so far as may be from floating or suspended tar, is known as crude pyroligneous acid. It is customarily treated for utilization by various processes involving its distillation. It contains many substances, some of which are volatile in ordinary distillation and some of which are not. In addition to the water, which is its main constituent, it carries dissolved acetic and other acids, methyl alcohol, acetone and other ketones, various aldehydes, and many other substances of whose nature less is known. Some of the tar is kept in solution by the solvent influence of the acid, the alcohol, the acetone, etc. On distillation of the acid this dissolved tar remains behind. In addition it carries a number of substances which react with each other on heating to produce bodies of a tarry nature which also remain in the still on distillation. The presence of the bodies which will produce tarry or resinous substances on heating is a source of great inconvenience in the distillation of pyroligneous acid.

It is an object of this invention to simplify distillation by a prior removal of the bodies which separate on heating.

The main products sought to be separated from the crude acid in distillation are wood alcohol and acetic acid. The alcohol is usually separated by distillation and the acetic acid by the addition of lime or other alkali to the solution containing the same whereby an acetate of the base used is formed which upon evaporation of the volatile portions of the neutralized liquor becomes crystallized in the form of acetate of the lime or other base. In distilling the crude acid for the purpose of separating the various constituents therefrom considerable difficulty is experienced by the accumulation of these non-volatile substances in the still and the main object of my invention is to provide a process whereby stills may be run continuously without becoming clogged with these non-volatile substances, which ordinarily accumulate therein. These substances are of tarry or resinous nature and may be here called tar. This result I accomplish by first separating out the tarry or resinous substances that are precipitated or rendered insoluble by heating the crude acid to a tar-forming temperature and thus getting rid of a portion of the objectionable materials; that is by heating to a temperature higher than will be used in the subsequent distillation. In this heating no substantial escape of vapors is permitted; it is a heating operation as distinguished from a distillation. By providing two or more of these heaters to be used alternately one of the heaters can be used while cleaning the other, thus giving a continuous supply of acid that has been heated and from which the precipitated material has been removed, which supply is then run into the still and portions thereof distilled over, leaving a residue of such non-volatile material as was not precipitated by heating. This residue as it becomes concentrated also prevents, to a considerable extent, the transmission of heat and to avoid this difficulty, I provide a series of stills, preferably three, in which the pyroligneous acid is successively treated thereby performing a portion only of the concentration in each still and thus the thicker and more concentrated residue remaining is found only in the last still of the series. I am thus able to run the stills continuously by providing means for passing the pyroligneous acid from one still to the other in succession, drawing off from the last still the thick and concentrated residue. I also economize the use of steam or other heating medium by progressively reducing the pressure in this series of stills whereby vaporization takes place at successively lower temperatures. By raising the temperature to the maximum before distillation begins and distilling at a lower temperature any further precipitation in the stills of substances which are thrown down by heating is wholly avoided. I can also by so doing utilize the heat in the vapor coming over by working the first still at a higher temperature and pressure to serve as a heating medium in the next succeeding or second still, and the said second still in turn serves as a condenser for the vapor from the first still. The same is also true in respect to the relation between the second and third stills. Obviously this series of stills may be increased or decreased in number but I find three stills to operate quite satisfactorily.

Obviously the apparatus may be adjusted to work under high pressure or above the atmosphere or under low pressure or below that of the atmosphere, or partially above and below the same. In the event of using high pressure a pump is required to force the liquid through the apparatus or other means may be used for supplying sufficient pressure on the crude acid to serve the purpose of preventing evaporation in the heaters, and in the event of using low pressure a vacuum pump at the discharge end of the apparatus to maintain a vacuum in the same would be necessary. In some cases atmospheric pressure might be sufficient to force the crude acid through the apparatus. Suitable pumps, condensers, valves and pressure reducers would also be required to equip an apparatus to carry out the process and the usual drainage cocks (not shown) provided for the various vessels, such as the stills, heaters, etc.

I have herewith illustrated in diagrammatic form a form of apparatus adapted to work under high pressure, in which 1 represents any convenient tank or reservoir to contain the crude pyroligneous acid; 2 a pump to force the same through the apparatus, operated in any convenient manner; and 3 and 4 two steam jacketed vessels having removable covers for the purpose of cleaning the same, through which vessels the acid alternately flows, one of these being used while the other is being cleaned. These vessels should be of sufficient size so that the upward flow through the same is slow enough to permit of heating the contents thereof and of the settling of any ingredients which are precipitated or separated out by the heat and left in the vessel. I thus provide a highly heated supply of crude pyroligneous acid which has parted with a portion of its ingredients which would otherwise be thrown down in the stills and thus no precipitates of this character are found in the stills which are operated at or below the temperature of the heaters 3 and 4. 5, 6, and 7 are a series of stills connected by pipes through which the pyroligneous acid passes from one to the other in succession.

8 and 9 are condensers or coolers which condense and cool the vapor and liquid coming from the stills.

10 is a pump which serves to remove any liquids that condense in the heating coils of the second and third stills and force the same into the cooler 8.

11 is a pump which removes the residue from the bottom of the third still after the volatile products have been distilled therefrom, said residue being of a thick tarry nature.

The heaters 3 and 4 are preferably steam jacketed and provided with steam or hot liquid from any convenient source through a pipe 21 and valves 22 and 23, and the drain pipe 24 and steam trap 25 take away the water of condensation.

The crude pyroligneous acid from the tank or reservoir 1 is conducted to the pump 2 by a pipe 1ª and thence to the lower part of the heaters 3 and 4 through a pipe 12 and valves 13 and 14. It is thence conducted by a pipe 17 to the first still 5. This pipe being in communication with the respective heaters through valves 15 and 16. Whenever a heater is to be cleaned its cover can be disconnected from the heater and valve, and the valves to that heater closed, whereupon the sediment in the bottom of the heater can be removed. In the meantime the other heater can be used to keep up the supply of heated acid to the still. A pipe 18 connects the bottom of the first still 5 with the next still 6 and is provided with a valve to check the flow therethrough whereby a proper quantity of pyroligneous acid can be maintained in the respective stills. The first still being worked at the highest temperature and pressure and heated preferably by means of steam supplied by a pipe 26 from any suitable source, and having a coil 27 or any other heating device within the still to heat the contents thereof, the condensation in this coil being taken off through a steam trap 28. The vapor from the still 5 escapes through a pipe 29 into a coil 30 in the second still 6 and thus serves to supply a heating medium to the said still. Sufficient pressure is maintained in the heaters to prevent vaporization of the contents thereof when raised to the maximum temperature, and above that of the contents of the first still. On the first still 5 a lower pressure than on the heater is maintained by a pressure regulator 34 through which the condensation in the coil 30 together with any surplus vapor from the still 5 escapes at a reduced pressure the liquid flowing downward through a pipe 32 to a pump 10 for instance and thence forced through a pipe 37 to the cooler 8 and the surplus vapor escaping through the pipe 31 to the condenser 9. The vapor from the still 6 escapes through a pipe 33 to a coil 34ª in the still 7 and furnishes heat to operate this still 7, the condensation and surplus vapor escaping from the still 7 through the pressure regulator 35. The liquid escapes downward through the pipe 36 to the pump 10 and is thence forced up through the pipe 37 to the cooler 8. The surplus vapor from this still 7 also escapes upward through the pipe 35 and thence to the condenser 9. A pipe 38 carries the vapor from the still 7 into the pipe 31 and thence through the same to the condenser 9.

Obviously if so desired separate condensers can be provided for the vapor from each still and the condensation escaping through the respective pressure regulators runs into separate receptacles if so desired. These pressure regulators 34 and 35 are so adjusted that the pressure in the still 6 is less than that in the still 5 and the pressure in the still 7 less than that in the still 6. The successive reduction in pressure and temperature thus effectively utilizes the vapors of one still to heat the contents of the succeeding still and renders more effective the heat transmitted by the vapor escaping from the preceding still and at the same time avoids clogging the still by any substances thrown down by heating the contents thereof. It will thus be seen that the heat required is only that which is needed for maintaining the temperature and pressure in the still 5 and that the stills 6 and 7 are heated by the temperature carried over from the still 5 by the vapor escaping therefrom. It will also be noted that having heated the crude acid in the first heaters 3 and 4 up to the maximum temperature, no further precipitation takes place in the stills due to heating the said acid and the precipitate thrown down by heating is all left in the pre-heaters; that the still 5 contains the most dilute acid; that the still 6 contains a more concentrated acid and that in the still 7 the concentration reaches the maximum whereby the stills 5 and 6 are not materially obstructed by the density of the contents thereof. A pipe 20 communicates with the bottom of the still 7 and with the pump 11 to remove the concentrated and tarry residue. By adjusting the valves 32 and 33 or by float valves, the flow from one still to the other is so regulated as to maintain a proper quantity of liquid in each still.

I am aware that devices have been made to utilize the heat carried over by the vapor escaping from one still to heat another still, as for instance to operate crude acid stills by the vapor coming over from evaporating the neutralized acetic acid liquor, or evaporating the said neutralized liquor with the heat carried over by the vapors from the crude acid still. I do not claim such as my invention, but my invention consists briefly in the method of distilling crude pyroligneous acid by first heating the same to precipitate such portions as are susceptible to be thrown down by heating; removing the precipitate before the acid is carried into the stills and then distilling the acid in a series of stills, step by step whereby the more concentrated is in the last still of the series only, and the heat required to operate the series is all applied to the first still, the remaining series of the stills being operated by the heat in the vapor escaping from the preceding still. The first still being operated under the highest pressure and temperature, the remaining stills being operated at progressively lower temperatures and pressures. I am thus able to avoid clogging of the stills by precipitates due to heating the crude acid or by the concentrated residue, and am thus able to run the stills continuously for a long time.

The temperatures at which the device is operated and the proportion of distillate taken off and residue taken from the last still may obviously be varied at pleasure without departing from the process. So also the difference between the maximum temperature and pressure in the pre-heaters and settlers and the minimum temperature and pressure in the last still, may be more or less. I find in practice the process works well to carry a temperature in the pre-heater of about 212 F. working still No. 5 at about the same temperature and maintaining as high a vacuum on still No. 7 as convenient, and regulating the pressure in the pre-heater sufficient to prevent vaporization of any of the constituents of the contents and regulating the flow through the stills to secure the desired amount of distillation and concentration of residue in still No. 7.

What I claim is:—

1. A process for distilling crude pyroligneous acid, comprising heating the said acid to a relatively high, tar-forming temperature by any convenient means, separating, settling, and removing the precipitate formed in the crude acid by so heating before the acid enters the stills and thereafter distilling at a lower temperature, whereby the stills are not clogged by the said precipitate.

2. A process of distilling crude pyroligneous acid, comprising a preliminary heating of the said acid, separating therefrom the precipitate formed by so heating, and distilling the acid in a series of stills under progressively reduced pressures and temperatures all being below the temperature of the pre-heating step whereby the more concentrated residue is in the last still of the series only.

3. A process of distilling crude pyroligneous acid, consisting of a preliminary heating of the same and removal of the precipitate formed therein by so heating, passing the crude pyroligneous acid successively in a continuous stream through a series of stills working under progressively reduced pressures and temperatures, heating the first of the series of stills from an independent source of heat, and heating each succeeding still by means of the vapors escaping from the next preceding still.

4. A process of distilling crude pyroligneous acid, consisting of heating the same to a relatively high, tar-forming temperature in a preheater, removing therefrom the precipitate formed by so heating, supplying a continuous stream of the acid so treated to a series of connected stills, removing the concentrated residue from the last still of the series, heating the first still by means of an independent source of heat, heating each succeeding still by means of the vapors escaping from the next preceding still, and maintaining a progressively reduced pressure and temperature in each succeeding still, whereby the said stills may be operated continuously.

5. A process of distilling crude pyroligneous acid, comprising preliminary heating of the said acid to a relatively high, tar-forming temperature, separating the precipitate formed by said heating, supplying said acid continuously and in succession to a series of stills, heating the first of the series of stills from an independent source, heating each succeeding still by the vapor escaping from the next preceding still, removing the concentrated residue from the last still of the series, maintaining progressively reduced pressures and temperatures on the series of stills, removing the condensed distillate from the heating coils of each still in the series, condensing the residue of vapors not condensed in the respective stills and cooling the condensed liquid coming from the respective heating coils of the stills.

6. In the treatment of pyroligneous acid, the process which comprises heating such acid to a relatively high temperature in a suitable container without permitting any substantial escape of vapor, the heating being continued till tarry impurities separate, and distilling the thus purified liquid at lower temperatures than prevail in said container.

7. In the purification of pyroligneous acid, the process which comprises heating such acid under pressure in a suitable container without permitting any substantial escape of vapor until tarry impurities separate.

In testimony whereof I affix my signature in presence of two witnesses.

MAX KLAR.

Witnesses:
A. J. PRINCE,
CHRISTOPH E. OTT.